(12) United States Patent
Suzuki

(10) Patent No.: US 10,039,137 B2
(45) Date of Patent: Jul. 31, 2018

(54) ELECTRIC POWER TOOL AND DUST COLLECTOR

(71) Applicant: MAKITA CORPORATION, Anjo-shi, Aichi (JP)

(72) Inventor: Hitoshi Suzuki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 359 days.

(21) Appl. No.: 14/965,363

(22) Filed: Dec. 10, 2015

(65) Prior Publication Data
US 2016/0175895 A1 Jun. 23, 2016

(30) Foreign Application Priority Data

Dec. 17, 2014 (JP) ................................ 2014-255330

(51) Int. Cl.
- *H04W 76/02* (2009.01)
- *H04W 4/80* (2018.01)
- *H04W 76/10* (2018.01)

(52) U.S. Cl.
CPC ............. *H04W 76/02* (2013.01); *H04W 4/80* (2018.02); *H04W 76/10* (2018.02)

(58) Field of Classification Search
CPC .. G06K 19/0723; H04W 84/18; A47L 7/0095; A47L 9/2857
USPC ........................................................ 455/41.1
See application file for complete search history.

(56) References Cited

U.S. PATENT DOCUMENTS

| 4,306,329 | A | * | 12/1981 | Yokoi | A47L 11/4011 15/319 |
|---|---|---|---|---|---|
| 4,369,543 | A | * | 1/1983 | Chen | A47L 11/4011 15/319 |
| 5,274,878 | A | * | 1/1994 | Radabaugh | A47L 5/38 15/314 |
| 5,606,767 | A | * | 3/1997 | Crlenjak | A47L 5/38 15/301 |
| 5,709,007 | A | * | 1/1998 | Chiang | A47L 5/225 15/329 |
| 5,839,156 | A | * | 11/1998 | Park | A47L 5/30 15/339 |

(Continued)

FOREIGN PATENT DOCUMENTS

| EP | 2628427 A2 | 8/2013 |
|---|---|---|
| JP | H09-224279 A | 8/1997 |

(Continued)

OTHER PUBLICATIONS

May 8, 2018 Office Action issued in Japanese Patent Application No. 2014-255330.

*Primary Examiner* — Hai V Nguyen
(74) *Attorney, Agent, or Firm* — Oliff PLC

(57) ABSTRACT

An electric power tool includes a wireless transmission unit and a transmission control unit that causes the wireless transmission unit to transmit a linking signal to a dust collector to thereby cause the dust collector to operate in a linked manner. An operation mode of the transmission control unit is shifted from a normal mode to a pairing mode by operation of an operation unit. When in the pairing mode, the transmission control unit causes the wireless transmission unit to transmit a pairing request signal to the dust collector. In this way, the electric power tool can be registered in the dust collector as a link target appliance.

20 Claims, 10 Drawing Sheets

(56) References Cited

U.S. PATENT DOCUMENTS

| | | | | |
|---|---|---|---|---|
| 5,955,791 | A * | 9/1999 | Irlander | H01H 47/001 307/116 |
| 6,502,949 | B1 * | 1/2003 | Horiyama | B23Q 11/0046 173/217 |
| 7,751,829 | B2 * | 7/2010 | Masuoka | G01S 5/0294 455/41.2 |
| 7,900,315 | B2 * | 3/2011 | Cunningham | A47L 5/38 15/301 |
| 7,953,032 | B2 * | 5/2011 | Liang | H04W 88/06 370/311 |
| 9,108,285 | B2 * | 8/2015 | Usselman | A47L 7/0095 |
| 9,723,959 | B2 * | 8/2017 | Suzuki | A47L 7/0095 |
| 9,826,873 | B2 * | 11/2017 | Abe | A47L 11/4011 |
| 9,916,739 | B2 * | 3/2018 | Suzuki | G08B 1/08 |
| 2007/0250212 | A1 * | 10/2007 | Halloran | A47L 5/30 700/245 |
| 2008/0004751 | A1 * | 1/2008 | Chung | G05D 1/0225 700/258 |
| 2008/0022479 | A1 * | 1/2008 | Zhao | A47L 7/0085 15/319 |
| 2008/0176548 | A1 * | 7/2008 | Liang | H04W 88/06 455/419 |
| 2009/0229842 | A1 * | 9/2009 | Gray | H01M 2/1055 173/20 |
| 2012/0073077 | A1 * | 3/2012 | Ishikawa | A47L 9/2842 15/347 |
| 2012/0214522 | A1 * | 8/2012 | Cunningham | H04W 72/0453 455/500 |
| 2014/0022940 | A1 * | 1/2014 | Apte | G01S 1/68 370/254 |
| 2014/0022941 | A1 * | 1/2014 | Apte | H04L 41/0806 370/254 |
| 2014/0023363 | A1 * | 1/2014 | Apte | H04L 12/2803 398/43 |
| 2014/0151079 | A1 * | 6/2014 | Furui | B25F 5/02 173/46 |
| 2014/0261551 | A1 * | 9/2014 | Usselman | A47L 9/2842 134/18 |
| 2014/0304939 | A1 * | 10/2014 | Suzuki | A47L 9/2842 15/339 |
| 2015/0214520 | A1 * | 7/2015 | Nishikawa | B25F 5/02 429/100 |
| 2016/0100724 | A1 * | 4/2016 | Valentini | H02K 7/145 134/18 |
| 2016/0151846 | A1 * | 6/2016 | Suzuki | B25F 5/00 340/12.5 |
| 2016/0226278 | A1 * | 8/2016 | Wenger | H02J 7/0044 |
| 2016/0309974 | A1 * | 10/2016 | Abe | A47L 9/28 |

FOREIGN PATENT DOCUMENTS

| | | |
|---|---|---|
| JP | 2004-195565 A | 7/2004 |
| JP | 2009-260934 A | 11/2009 |
| JP | 2010-63016 A | 3/2010 |
| JP | 2014-22770 A | 2/2014 |

* cited by examiner

ELECTRIC POWER TOOL AND DUST COLLECTOR

CROSS-REFERENCE TO RELATED APPLICATIONS

This application claims the benefit of Japanese Patent Application No. 2014-255330 filed Dec. 17, 2014 in the Japan Patent Office, the disclosure of which is incorporated herein by reference.

BACKGROUND

The present disclosure relates to an electric power tool capable of causing a dust collector to operate in a linked manner, and to the dust collector.

As a conventional electric power tool for machining, cutting, drilling, and the like of a workpiece, an electric power tool is known that is configured to cause a dust collector to operate in a linked manner in order to suction dust and chips produced by use of the electric power tool.

Here, even when the electric power tool is a rechargeable tool provided with a rechargeable battery, the electric power tool cannot be moved freely if it is configured such that a linking signal for causing the dust collector to operate in a linked manner is transmitted in a wired manner.

For example, in EP 2628427 A2, it is suggested that, in a system in which at least one electric power tool and a dust collector can be linked with each other (hereinafter also referred to as a linked system), the at least one electric power tool and the dust collector each comprise a communication device for wireless communication. At least one linking signal is transmitted wirelessly from the at least one electric power tool to the dust collector via the respective communication devices.

In the linked system of this kind, when the at least one electric power tool comprises a plurality of electric power tools (i.e., when a plurality of the electric power tools are present around the dust collector), the communication device in the dust collector can receive radio waves transmitted from the respective communication devices in the plurality of electric power tools.

EP 2628427 A2 also suggests that the linked system is configured such that identification information of the at least one electric power tool, which is a link target, is registered in the dust collector and the dust collector is linked with the at least one electric power tool only when the at least one linking signal received by the communication device in the dust collector contains the registered identification information.

SUMMARY

Meanwhile, in the above-described linked system, when registering the identification information of the at least one electric power tool in the dust collector, a switch (an electrical contact) for registration provided to the dust collector is to be pressed.

After the switch is pressed, when the dust collector receives the linking signal transmitted from the at least one electric power tool, the dust collector registers the identification information contained in the linking signal as identification information of the at least one electric power tool to be linked.

Thus, in the above-described linked system, even when the plurality of electric power tools are present around the dust collector, the dust collector can operate only by receiving the linking signal from a specific electric power tool whose identification information has been registered, among the plurality of electric power tools. In this way, the dust collector can be inhibited from erroneously operating by receiving the linking signal from the at least one electric power tool that does not correspond to the dust collector (i.e., from the at least one electric power tool whose identification information has not been registered), among the plurality of electric power tools.

However, since the switch provided to the dust collector has to be operated when registering the identification information of the at least one electric power tool in the dust collector, the linked system has a problem in terms of usability.

For example, when a place where the at least one electric power tool is used is away from the dust collector, in order to register the identification information of the at least one electric power tool in the dust collector, a user of the at least one electric power tool needs to move over to the place where the dust collector is located and to operate the switch for registering the identification information. Such a registration process is troublesome, and this could be a problem.

In the system in which the dust collector is caused to operate in a linked manner with the at least one electric power tool, it is desirable that the at least one electric power tool that is a linked-operation target can be registered in the dust collector more easily.

An electric power tool according to one aspect of the present disclosure comprises a wireless transmission unit that transmits a wireless signal to a dust collector; and a transmission control unit that causes the wireless transmission unit to transmit a linking signal to the dust collector, to thereby cause the dust collector to operate in a linked manner with operation of the electric power tool.

An operation mode of the transmission control unit is shifted, by operation of an operation unit provided to the electric power tool, from a normal mode in which the dust collector is caused to operate in a linked manner to a pairing mode in which the electric power tool is caused to be registered in the dust collector as a link target appliance.

When the operation mode is shifted to the pairing mode, the transmission control unit causes the wireless transmission unit to transmit a pairing request signal to the dust collector, and causes the electric power tool to be registered in the dust collector as the link target appliance.

A dust collector according to one aspect of the present disclosure comprises a motor for dust collection; a wireless reception unit that receives at least one wireless signal transmitted from at least one electric power tool; and a reception control unit that drives the motor in accordance with at least one linking signal received by the wireless reception unit.

When at least one pairing request signal is received by the wireless reception unit, an operation mode of the reception control unit is shifted from a normal mode in which the motor is driven in accordance with the at least one linking signal to a pairing mode.

When the operation mode is shifted to the pairing mode, the reception control unit registers a specific electric power tool that has transmitted one of the at least one pairing request signal, among the at least one electric power tool, as a link target appliance that will transmit one of the at least one linking signal for driving the motor.

With the electric power tool and the dust collector according to one aspect of the present disclosure, when establishing a linked system (i.e., when registering the at least one electric power tool that is a link target appliance in the dust collector), all that has to be done is to operate the operation unit of the at least one electric power tool. In this case, a switch provided to the dust collector (a switch for registration) need not be operated. In the first place, the dust collector need not comprise the switch for registration.

Accordingly, a user of the at least one electric power tool need not move over to the dust collector in order to establish the linked system (i.e., in order to register the at least one electric power tool in the dust collector). Thus, the user can register the at least one electric power tool very easily.

In the electric power tool according to one aspect of the present disclosure, as the operation unit for inputting a request for shifting to the pairing mode, a switch of any kind provided to the electric power tool may be used, such as a trigger switch for activating the electric power tool.

In this case, it may be configured such that the transmission control unit can distinguish between input of other operation and input of the request for shifting by setting in advance an operation time period, the number of consecutive operations, or the like for input of the request for shifting.

As the operation unit, a pairing request switch for inputting the request for shifting to the pairing mode may be provided to the electric power tool.

The wireless transmission unit in the electric power tool may be configured to select a communication channel from a plurality of communication channels having different frequencies and to transmit the wireless signal through the selected communication channel.

With such a configuration, in the linked system including the dust collector and the at least one electric power tool, when the at least one electric power tool comprises a plurality of electric power tools (i.e., when a plurality of electric power tools are adjacent to the dust collector), it can be avoided that a plurality of wireless signals transmitted from the plurality of electric power tools are transmitted through the same channel. In other words, the possibility of mutual collision of the plurality of wireless signals can be reduced.

In this case, the wireless reception unit in the dust collector may be configured to select a communication channel from the plurality of communication channels having different frequencies and to receive the at least one wireless signal through the selected communication channel.

With such a configuration, in the dust collector, the electric power tool can be registered by setting the communication channel, through which the wireless reception unit receives the wireless signal, to a channel that is the same as the communication channel used for transmission of the linking signal by the electric power tool among the at least one electric power tool to be linked.

In this case, when registering the specific electric power tool in the dust collector as a link target appliance, the identification information of the electric power tool need not be registered, and the identification information of the electric power tool need not be contained in the signal transmitted from the electric power tool in order to register and/or identify the electric power, tool.

Thus, when the wireless transmission unit in the electric power tool and the wireless reception unit in the dust collector are configured as described above, it becomes easier to perform registration of the electric power tool in the dust collector, transmission of the wireless signal from the electric power tool, and identification of the signal received in the dust collector.

In this case, it is preferred that the plurality of communication channels that can be selected by the wireless transmission unit in the electric power tool and the plurality of communication channels that can be selected by the wireless reception unit in the dust collector are the same as each other in the number of the channels and in the frequency of each channel.

Next, when the wireless transmission unit in the electric power tool is configured to select one of the plurality of communication channels and to transmit the wireless signal through the selected communication channel, the transmission control unit may be configured to sequentially change the communication channel to be used by the wireless transmission unit to another communication channel among the plurality of communication channels and to cause the pairing request signal to be transmitted through the another communication channel.

Alternatively, the transmission control unit may be configured to cause the pairing request signal to be transmitted through a reserved channel set in advance for transmission of the pairing request signal, among the plurality of communication channels.

In this case, the reception control unit in the dust collector may be configured to set the communication channel through which the wireless reception unit receives the wireless signal to a specific channel set in advance and to cause the pairing request signal to be received through the specific channel.

That is, when the reception control unit is configured to set the communication channel to be used by the wireless reception unit to the specific channel set in advance, it is possible to acquire one of the pairing request signals transmitted through the above-described another communication channel from the electric power tool (i.e., the pairing request signal transmitted through the specific channel).

Alternatively, when the reception control unit is configured to set, as the specific channel, the reserved channel set for reception of the pairing request signal, it is possible to acquire the pairing request signal transmitted through the reserved channel from the electric power tool.

Next, in the electric power tool according to the present disclosure, the transmission control unit may be configured to cause the wireless transmission unit to transmit the pairing request signal to the dust collector to thereby shift an operation mode in the dust collector to a pairing mode, and then, to cause the wireless transmission unit to transmit a pairing setting signal to the dust collector through a unique channel, which is one of the plurality of communication channels, to thereby cause the electric power tool to be registered in the dust collector as the link target appliance.

When the electric power tool is configured as described above, the reception control unit in the dust collector may be configured, when the pairing request signal is received by the wireless reception unit and the operation mode of the reception control unit is shifted from the normal mode to the pairing mode, to sequentially change the communication channel to be used by the wireless reception unit from among the plurality of communication channels, to cause the wireless reception unit to receive the pairing setting signal transmitted from the electric power tool, and to register the communication channel through which the pairing setting signal has been received as the unique channel through which the link target appliance will transmit the linking signal (in other words, as a receiving channel for reception of the linking signal).

When the electric power tool and the dust collector are configured as described above, simply transmitting the pairing setting signal by the electric power tool through the unique channel set for transmission of the linking signal makes it possible to set the unique channel, in the dust collector, as a communication channel for reception of the linking signal.

In this case, it is not necessary to use the identification information or to perform two-way communication in order to pair up the electric power tool and the dust collector. Thus, pairing of the electric power tool and the dust collector is enabled by extremely simple communication operation.

Next, the transmission control unit in the electric power tool may be configured to change the unique channel in accordance with a channel change command inputted externally.

With such a configuration, a user of the electric power tool can change the communication channel (the unique channel) to be used for transmission of the pairing setting signal and the linking signal in the electric power tool.

For example, if two electric power tools use the same communication channel, there is a possibility that the dust collector operates by receiving two linking signals from the two individual electric power tools. In such a case, the communication channel to be used by one of the electric power tools can be changed. This can inhibit the dust collector from operating unintendedly in a linked manner with the two electric power tools.

When the communication channel to be used by one of the electric power tools has been changed, also in the dust collector to be linked with such an electric power tool, it is necessary that the communication channel (the unique channel) already set for reception of the linking signal can be changed.

For this purpose, the reception control unit in the dust collector may be configured, in a case where the unique channel has been already registered and when the operation mode of the reception control unit is shifted from the normal mode to the pairing mode and the pairing setting signal transmitted through the communication channel different from the unique channel is received, to register the communication channel through which the pairing setting signal has been received as a new unique channel to thereby update registration of the unique channel.

Further, in the electric power tool, the channel change command for changing the communication channel (the unique channel) may be inputted via a communication channel setting device that can designate the changed communication channel.

Meanwhile, in order to avoid overlapping of the communication channel used by one electric power tool and the communication channel used by other at least one electric power tool, all has to be done is to change the communication channel used by one electric power tool, and there is no problem in not being able to designate the changed communication channel.

Thus, the channel change command may be enabled to be inputted via the operation unit provided to the electric power tool by external operation thereof. The above-described pairing request switch can be used as the operation unit.

In this case, if the transmission control unit is configured to distinguish between the request for shifting to the pairing mode and the channel change command on the basis of an operation time period or the number of operations of the pairing request switch, it becomes possible to input the channel change command using the pairing request switch.

Next, in the electric power tool, the transmission control unit may be configured to cancel the pairing mode of the transmission control unit upon elapse of a specified time period set in advance after the operation mode is shifted to the pairing mode by operation of the operation unit.

This eliminates the necessity that, when the operation mode of the transmission control unit is the pairing mode, the user operates the operation unit to return the operation mode back from the pairing mode to the normal mode. Thus, usability of the electric power tool (and eventually, of the linked system) can be improved.

Similarly, in the dust collector, the reception control unit may be configured to cancel the pairing mode upon elapse of a specified time period set in advance after the operation mode of the reception control unit is shifted to the pairing mode.

With such a configuration, the reception control unit can be inhibited from failing to return to the normal mode when the at least one electric power tool that has transmitted the pairing request signal cannot be registered as the link target appliance due to a failure in communication or the like after the operation mode of the reception control unit is shifted to the pairing mode.

Next, the electric power tool may comprise a transmission prohibition switch for inputting a transmission prohibition command for prohibiting transmission of the linking signal from the wireless transmission unit. The transmission control unit may be configured to prohibit transmission of the linking signal from the wireless transmission unit when the transmission prohibition command is inputted via the transmission prohibition switch.

With such a configuration, when the dust collector need not be operated in a linked manner, such as in a case where the at least one electric power tool is carried to a place away from the dust collector and is used there, for example, the user prohibits transmission of the linking signal to the dust collector to thereby enable independent use of the at least one electric power tool.

Further, the dust collector may comprise a pairing prohibition switch for inputting a pairing prohibition command for prohibiting the operation mode of the reception control unit from being shifted to the pairing mode. The reception control unit may be configured, when the pairing prohibition command is inputted via the pairing prohibition switch, to prohibit the operation mode of the reception control unit from being shifted from the normal mode to the pairing mode by reception of the pairing request signal by the wireless reception unit.

With such a configuration, when the dust collector is paired up with the corresponding at least one electric power tool and other electric power tool to be operated in a linked manner need not be registered, the user can prohibit the reception control unit from going into the pairing mode by operating the pairing prohibition switch.

In this case, the reception control unit in the dust collector can be inhibited from going into the pairing mode by reception of the pairing request signal transmitted from other electric power tool that is not the link target appliance and from causing mis-registration of other electric power tool as the link target appliance.

Next, the transmission control unit in the electric power tool may be configured, when in the pairing mode, to decrease a transmission output from the wireless transmission unit to be lower than that in the normal mode.

With such a configuration, a signal level of the pairing request signal or other transmission signal (e.g., the above-described pairing setting signal) transmitted by the wireless transmission unit when the transmission control unit is in the pairing mode becomes lower than a transmission level of the linking signal.

Thus, the electric power tool can transmit the pairing request signal to the dust collector that is within an area narrower than at normal linked-operation; allowing the electric power tool to be registered in such a dust collector as the link target appliance. In this case, the possibility can be reduced that the electric power tool is erroneously registered, as the link target appliance, in the dust collector that need not be linked.

In this way, in order to inhibit the at least one electric power tool from being erroneously registered in the dust collector, a transmission level of the pairing request signal and the like from the at least one electric power tool need not necessarily be decreased. Instead, the reception control unit in the dust collector may be configured, when in the pairing mode, to decrease a reception sensitivity of the wireless reception unit to be lower than that in the normal mode.

Alternatively, in the pairing mode, a transmission level of the wireless signal from the at least one electric power tool and the reception sensitivity of the wireless signal in the dust collector may both be decreased.

Next, in the dust collector, the reception control unit may be configured, when registration of the link target appliance in the pairing mode has been successfully performed or when the registration has failed, to inform the user accordingly.

With such a configuration, after operating the operation unit in the at least one electric power tool to establish the linked system, the user of the at least one electric power tool can confirm that the at least one electric power tool has been registered in the desired dust collector as the link target appliance or that such registration has failed.

BRIEF DESCRIPTION OF THE DRAWINGS

Embodiments of the present disclosure will now be described below with reference to the accompanying drawings, in which.

DETAILED DESCRIPTION OF THE PREFERRED EMBODIMENTS

First Embodiment

Figure 1:
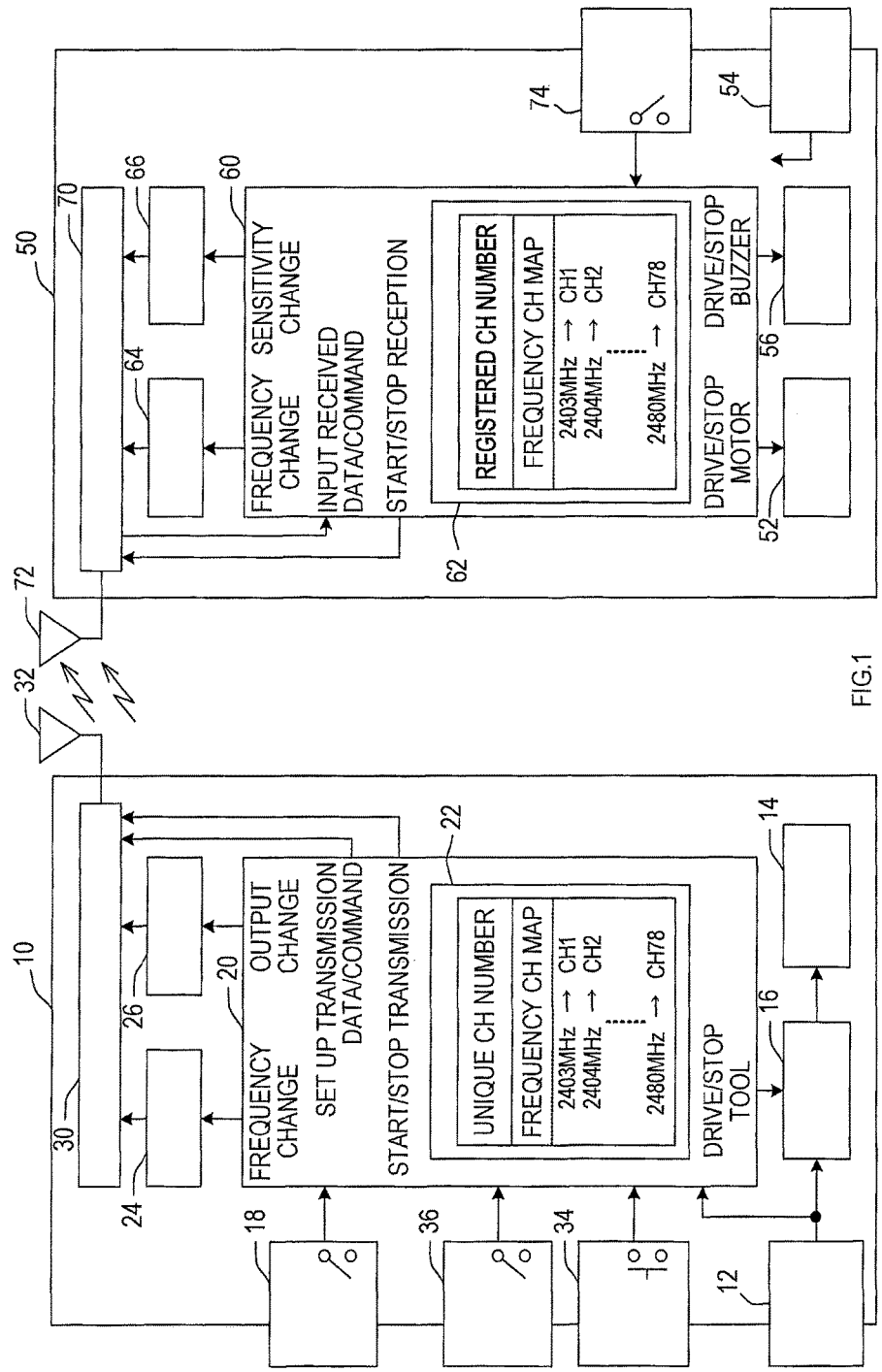
FIG. 1 is a block diagram showing a configuration of a linked system in a first embodiment.

As shown in FIG. 1, a linked system of the present embodiment comprises an electric power tool 10 and a dust collector 50. In this linked system, when the electric power tool 10 is used, the dust collector 50 is caused to operate in a linked manner, to thereby enable the dust collector 50 to automatically suction dust and chips produced by use of the electric power tool 10.

The electric power tool 10 may be a tool, such as a grinder, a circular saw, and a driver drill, that produces dust and chips while being used. The electric power tool 10 is operated by receiving power supply from a battery pack 12 including a rechargeable battery.

The battery pack 12 is attachable to and detachable from a main body of the electric power tool 10. The battery pack 12 is configured such that attachment thereof to a charger causes charging of the battery inside the battery pack 12.

The electric power tool 10 comprises a drive unit 16 that drives a tool motor 14, which is a power source, a trigger switch (switch is hereinafter referred to as SW) 18, by external operation of which a user inputs a drive command, and a control unit 20.

When the trigger SW 18 is in an ON state, the control unit 20 drives the tool motor 14 via the drive unit 16, as well as causing the dust collector 50 to operate in a linked manner.

Specifically, the electric power tool 10 comprises a wireless transmission unit 30 that wirelessly transmits, via an antenna 32, a command for causing the dust collector 50 to operate in a linked manner. The control unit 20 causes the wireless transmission unit 30 to wirelessly transmit a linking signal, to thereby cause the dust collector 50 to operate in a linked manner.

The control unit 20 sets up transmission data or a command in the wireless transmission unit 30, and commands the wireless transmission unit 30 to start transmission, to thereby cause various command signals (such as a pairing request signal, a pairing setting signal, and so on, which are to be described later) including the linking signal to be wirelessly transmitted from the wireless transmission unit 30 to the dust collector 50.

The wireless transmission unit 30 wirelessly transmits the linking signal and so on using radio waves in the 2.4 GHz band, for example. A transmission frequency used for wireless transmission by the wireless transmission unit 30 can be changed via a transmission frequency changing unit 24 in increments of a specific frequency (e.g., in increments of 1 MHz), and a transmission output (power) of wireless transmission can be changed via a transmission output changing unit 26.

In addition to the trigger SW 18, the electric power tool 10 comprises a pairing request SW 34 and a transmission prohibition SW 36 as operation units to be operated by the user. The pairing request SW 34 is used to register the electric power tool 10 in the dust collector 50 for pairing therewith. The transmission prohibition SW 36 is used to prohibit transmission of a linking signal from the wireless transmission unit 30.

The trigger SW 18 and the transmission prohibition SW 36 are each a selector switch by external operation of which an ON state and an OFF state can be switched. The pairing request SW 34 is a push-button switch that is in an ON state only while the user is operating it (holding it down).

The control unit 20 comprises a microprocessor (MPU) including a memory 22 and input/output circuits, and causes the wireless transmission unit 30 to transmit a linking signal when the trigger SW 18 is in an ON state.

When the pairing request SW 34 is operated, an operation mode of the control unit 20 is shifted from a normal mode in which a linking signal is transmitted in accordance with the state of the trigger SW 18 to a pairing mode in which the electric power tool 10 and the specific dust collector 50 are paired up with each other.

In the pairing mode, the control unit 20 causes the wireless transmission unit 30 to transmit a pairing request signal, to thereby shift an operation mode in the dust collector 50 from a normal mode in which linked operation is performed to a pairing mode.

After the pairing request signal is transmitted, the control unit 20 causes the wireless transmission unit 30 to transmit a pairing setting signal to the dust collector 50 that has shifted into a pairing mode. The pairing setting signal is a signal for registering the electric power tool 10 in the dust collector 50 as a link target appliance.

In the memory 22 of the control unit 20, a transmission channel (unique channel, channel is hereinafter referred to as CH) is stored that represents a transmission frequency used when the control unit 20 causes the wireless transmission unit 30 to transmit a linking signal.

The transmission CH used by the wireless transmission unit 30 can be set to any of CH1 to CH78, for example. A frequency CH map showing a relationship between each transmission CH and a corresponding transmission frequency is stored in the memory 22.

When causing the wireless transmission unit 30 to transmit a linking signal, the control unit 20 reads out, from the frequency CH map, a transmission frequency corresponding to a unique CH for transmission of the linking signal, and changes the transmission frequency via the transmission frequency changing unit 24.

The dust collector 50 comprises a dust collection hose (not shown), a leading end of which is positioned in the vicinity of the electric power tool 10. The dust collector 50 suctions dust and chips present around the electric power tool 10 via the dust collection hose. The dust collector 50 comprises a dust collection motor 52 that drives a suction fan.

The dust collector 50 comprises a power supply unit 54 that generates a power-supply voltage for driving internal circuits including the dust collection motor 52, by receiving power supply from a commercial power supply. The dust collector 50 also comprises a control unit 60 for driving the dust collection motor 52 in a linked manner with the electric power tool 10, and a wireless reception unit 70.

In accordance with a command from the control unit 60, the wireless reception unit 70 receives, via an antenna 72, various command signals, such as a linking signal, a pairing request signal, a pairing setting signal, transmitted from the wireless transmission unit 30 in the electric power tool 10. The wireless reception unit 70 can receive a wireless signal in the 2.4 GHz band, and inputs the received data or command into the control unit 60.

Similarly to the wireless transmission unit 30 in the electric power tool 10, a reception frequency in the wireless reception unit 70 can be changed via a reception frequency changing unit 64 in increments of a specific frequency (e.g., in increments of 1 MHz). Reception sensitivity in the wireless reception unit 70 also can be changed via a reception sensitivity changing unit 66.

The control unit 60 comprises a microprocessor (MPU) including a memory 62 and input/output circuits. When a linking signal is received by the wireless reception unit 70, the control unit 60 drives the dust collection motor 52, to thereby cause the dust collector 50 to operate in a linked manner with the electric power tool 10.

The specific electric power tool 10 can be registered, by the control unit 60, in the dust collector 50 as a link target appliance to be operated in a linked manner. In order that a linking signal from the specific electric power tool 10 can be identified in the dust collector 50, the transmission CH (the unique CH as described above) corresponding to the linking signal from the specific electric power tool 10 is registered in the memory 62.

Similarly to the wireless transmission unit 30 in the electric power tool 10, in the wireless reception unit 70, a reception CH can be set to any of CH1 to CH78. A frequency CH map similar to that stored in the memory 22 is stored in the memory 62.

When in a normal mode in which the control unit 60 links the dust collector 50 with the electric power tool 10, the control unit 60 sets the reception frequency in the wireless reception unit 70 to a frequency corresponding to the transmission CH (registered CH) registered in the memory 62. This enables the linking signal transmitted from the specific electric power tool 10 to be received in the dust collector 50.

When the linking signal transmitted from the specific electric power tool 10 is received by the wireless reception unit 70, the control unit 60 drives the dust collection motor 52, to thereby cause the dust collector 50 to suction dust and chips produced by operation of the electric power tool 10.

When the pairing request signal transmitted from the wireless transmission unit 30 in the electric power tool 10 is received by the wireless reception unit 70, the control unit 60 shifts its operation mode from a normal mode to a pairing mode, and performs a pairing process. The pairing process is a process intended to register the electric power tool 10 that has transmitted the pairing request signal as a link target appliance.

The dust collector 50 is provided with a buzzer 56. The buzzer 56 is a buzzer intended to inform the user of the result of the pairing process (specifically, whether the pairing has succeeded or failed).

Since the pairing process is a process intended to register the electric power tool 10 as a link target appliance (in other words, a process intended to register the unique CH), it could happen that an electric power tool other than a link target appliance might be registered erroneously if the pairing process is designed to be performed any time upon reception of a pairing request signal.

Thus, the dust collector 50 is also provided with a pairing prohibition SW 74. The pairing prohibition SW 74 is a switch for inputting, into the control unit 60, a pairing prohibition command for prohibiting the control unit 60 from performing the pairing process.

Next, an explanation will be given of a linking signal transmission process performed by the control unit 20 in the electric power tool 10 and a link control process performed by the control unit 60 in the dust collector 50, with reference to a flowchart shown in FIG. 2. These processes are performed to operate the dust collector 50 in a linked manner with the electric power tool 10.

Figure 2:
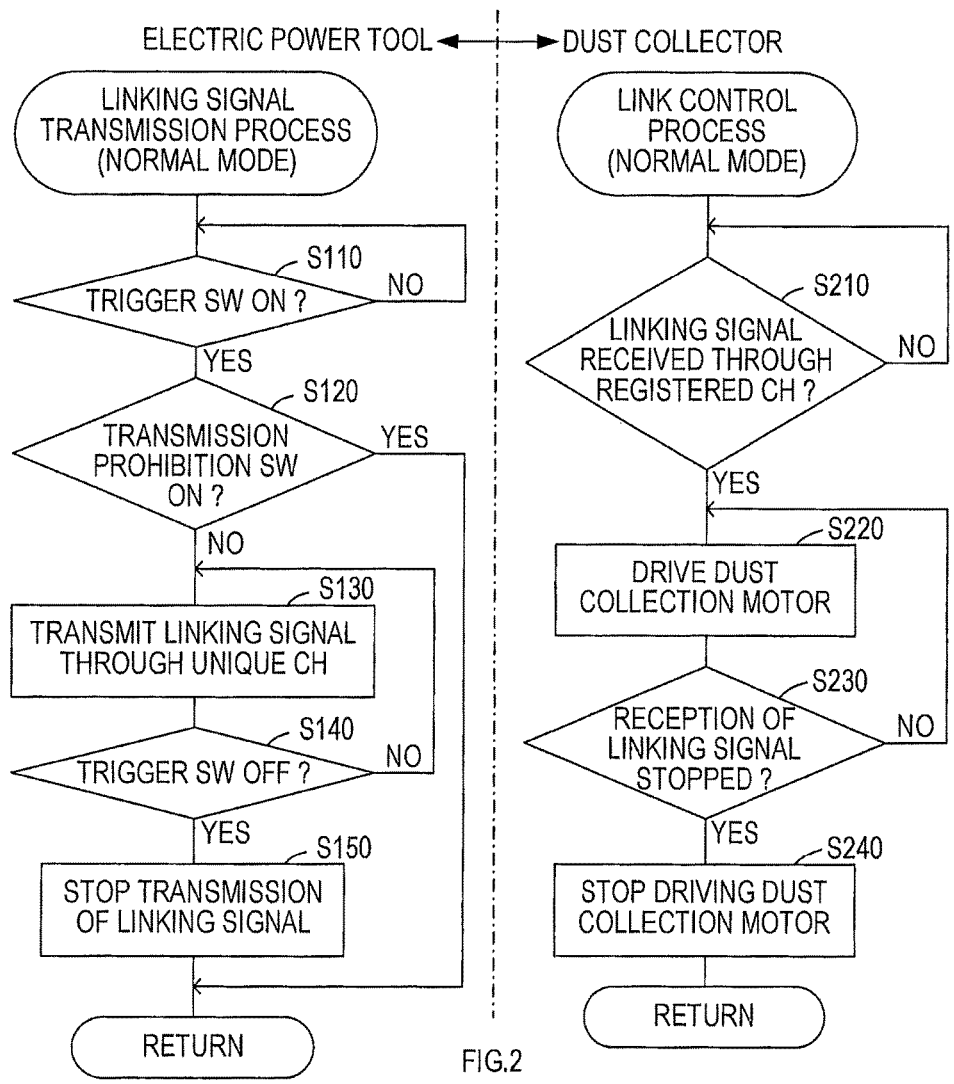
FIG. 2 is a flowchart showing a linking signal transmission process performed by an electric power tool and a link control process performed by a dust collector.

The linking signal transmission process and the link control process shown in FIG. 2 are each repeatedly performed by the control units 20 and 60, respectively, when the operation modes of the control unit 20 in the electric power tool 10 and the control unit 60 in the dust collector 50 are each a normal mode.

In the linking signal transmission process, the control unit 20 first determines, in S110 (S stands for step), whether the trigger SW 18 is in an ON state, and waits until the trigger SW 18 goes into an ON state.

When the trigger SW 18 goes into an ON state, driving of the tool motor 14 is started in a motor control process separately performed by the control unit 20. Then, since it is necessary to cause the dust collector 50 to operate in a linked manner, the process proceeds to S120, where it is determined whether the transmission prohibition SW 36 is in an ON state.

If the transmission prohibition SW 36 is in an ON state, transmission of a linking signal to the dust collector 50 is prohibited, and thus, the linking signal transmission process is terminated. Even when the linking signal transmission process is terminated, the linking signal transmission process is performed again after elapse of a specific standby time, as long as the operation mode of the control unit 20 is a normal mode.

If it is determined in S120 that the transmission prohibition SW 36 is in an OFF state, transmission of a linking signal from the wireless transmission unit 30 is permitted, and thus, the process proceeds to S130, where a linking signal is transmitted from the wireless transmission unit 30.

In S130, if the transmission frequency corresponding to the linking signal from the wireless transmission unit 30 does not correspond to the unique CH stored in the memory 22, the transmission frequency in the wireless transmission unit 30 is set to a frequency corresponding to the unique CH via the transmission frequency changing unit 24. In this way, the linking signal is transmitted from the wireless transmission unit 30 through the unique CH.

After the linking signal is transmitted in S130, the process proceeds to S140, where it is determined whether the trigger SW 18 is in an OFF state. If the trigger SW 18 is not in an OFF state, the process proceeds to S130 again, where transmission of the linking signal is continued.

If it is determined in S140 that the trigger SW 18 is in an OFF state, driving of the tool motor 14 is stopped, and thus, the process proceeds to S150, where transmission of the linking signal from the wireless transmission unit 30 is stopped. Then, the linking signal transmission process is terminated.

Next, in the link control process, the control unit 60 first determines, in S210, whether the linking signal has been received by the wireless reception unit 70 in a state where the reception frequency in the wireless reception unit 70 is set to a frequency of the registered CH stored in the memory 62. That is, in S210, the control unit 60 waits until the linking signal from the electric power tool 10 paired up in advance is received by the wireless reception unit 70.

If it is determined in S210 that the linking signal has been received, the process proceeds to S220, where the dust collection motor 52 is driven. Subsequently in S230, it is determined whether the linking signal is no longer being received by the wireless reception unit 70.

If it is determined in S230 that the linking signal is being received by the wireless reception unit 70, the process proceeds to S220, where driving of the dust collection motor 52 is continued. If it is determined in S230 that the linking signal is no longer being received by the wireless reception unit 70, driving of the dust collection motor 52 is stopped in S240. Then, the link control process is terminated.

Similarly to the linking signal transmission process performed in the electric power tool 10, even when the link control process is terminated, the link control process is performed again after elapse of a specific standby time, as long as the operation mode of the control unit 60 is a normal mode.

Next, an explanation will be given of pairing processes performed by the control unit 20 in the electric power tool 10 and the control unit 60 in the dust collector 50, with reference to a flowchart shown in FIGS. 3A and 3B. The pairing processes are intended to pair up the electric power tool 10 and the dust collector 50 with each other.

Similarly to the linking signal transmission process and the link control process described above, the pairing processes are performed when the operation modes of the control units 20 and 60 are each a normal mode. On the other hand, the control unit 60 in the dust collector 50 stops performing the pairing process when the pairing prohibition SW 74 is in an ON state, in which pairing with the electric power tool 10 as a link target appliance (specifically, registration or registration change of the electric power tool 10) is prohibited.

When a pairing request is inputted while performing the pairing processes, the control units 20 and 60 respectively shift the operation modes of the control units 20 and 60 each from a normal mode to a pairing mode, to thereby stop the linking signal transmission process or the link control process shown in FIG. 2, and start processes for pairing.

Figure 3A:
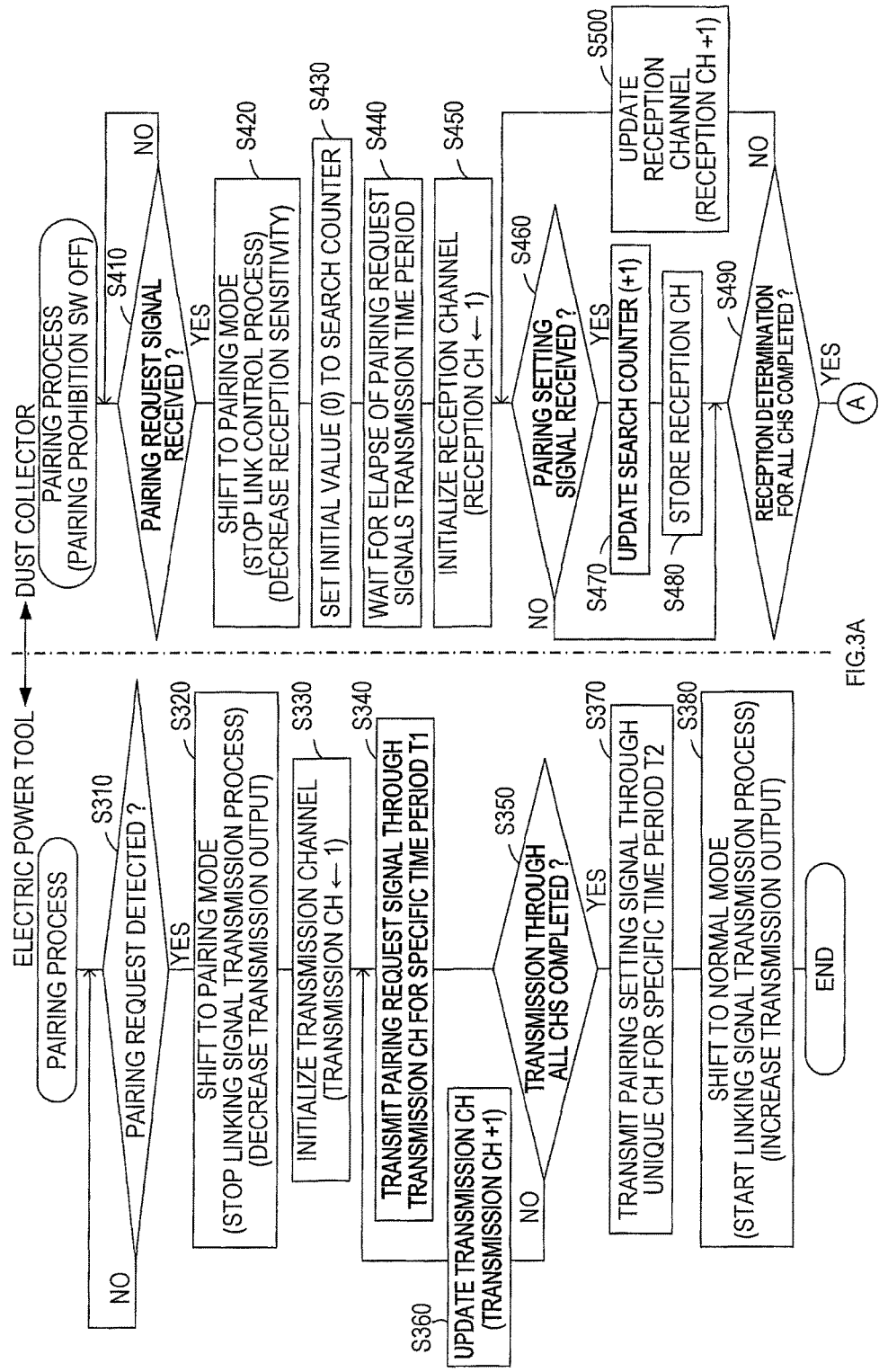
FIG. 3A is a flowchart showing pairing processes performed by the electric power tool and the dust collector.
Figure 3B:
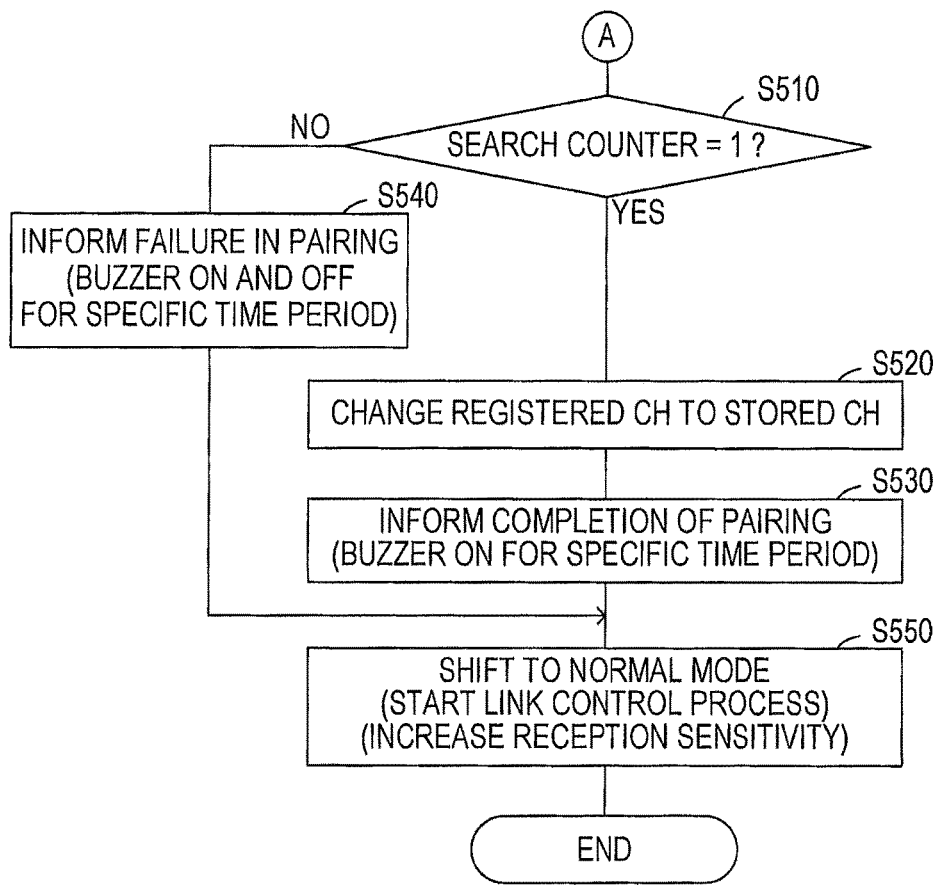
FIG. 3B is the flowchart showing the pairing process performed by the dust collector.

As shown in FIG. 3A, in the pairing process performed by the control unit 20 in the electric power tool 10, it is determined in S310 whether the pairing request SW 34 has been operated to input a pairing request, and the control unit 20 waits until a pairing request is inputted.

If it is determined in S310 that a pairing request has been inputted, the process proceeds to S320, where the operation mode of the control unit 20 is shifted to a pairing mode. Then, the process proceeds to S330.

The shift to the pairing mode in S320 is performed by stopping performing the linking signal transmission process shown in FIG. 2 to thereby decrease output (transmission power) from the wireless transmission unit 30 to be lower than the output in the normal mode via the transmission output changing unit 26.

In S330, the transmission frequency in the wireless transmission unit 30 is initialized via the transmission frequency changing unit 24 so that the transmission CH in the wireless transmission unit 30 becomes an initial value, i.e., CH1. Subsequently in S340, a pairing request signal is transmitted from the wireless transmission unit 30 through the set transmission CH for a specific time period T1 (e.g., 10 ms).

After the pairing request signal is transmitted from the wireless transmission unit 30 for the specific time period T1 in S340, the process proceeds to S350, where it is determined whether transmission of the pairing request signals has been completed through all the CHs (e.g., CH1 to CH78) stored in the memory 22.

If it is determined in S350 that transmission of the pairing request signals has not been completed for all the CHs, the process proceeds to S360, where the CH number of the transmission CH is counted up by the value 1 (+1), to thereby update the transmission CH. Then, the process proceeds to S340.

As a result, in S340, a pairing request signal is transmitted from the wireless transmission unit 30 at the transmission frequency corresponding to the CH number obtained by adding the value 1 to the number of the transmission CH through which the pairing request signal was transmitted last time.

This process in S340 is repeatedly performed until it is determined in S350 that transmission of the pairing request signals for all the CHs has been completed. If it is determined in S350 that transmission of the pairing request signals for all the CHs has been completed, the process proceeds to S370.

In S370, the transmission frequency in the wireless transmission unit 30 is set via the transmission frequency changing unit 24 so that the transmission frequency in the wireless transmission unit 30 becomes a frequency corresponding to the unique CH stored in the memory 22, and a pairing setting signal is transmitted from the wireless transmission unit 30 through the unique CH for a specific time period T2 (e.g., 1 s).

Subsequently in S380, the operation mode of the control unit 20 is shifted to a normal mode. Then, the pairing process is terminated. The shift to the normal mode in S380 is performed by restoring the output (transmission power) from the wireless transmission unit 30 via the transmission output changing unit 26 and by starting the linking signal transmission process shown in FIG. 2.

Next, as shown in FIG. 3A, in the pairing process performed by the control unit 60 in the dust collector 50, it is first determined in S410 whether the pairing request signal has been received by the wireless reception unit 70 in a state where the reception frequency in the wireless reception unit 70 is set to a frequency of the registered CH stored in the memory 62. That is, in S410, the control unit 60 waits until the pairing request signal is transmitted from the electric power tool 10 through the registered CH.

If it is determined in S410 that the pairing request signal has been received, the process proceeds to S420, where the operation mode of the control unit 60 is shifted to a pairing mode. Then, the process proceeds to S430.

The shift to the pairing mode in S420 is performed by stopping performing the link control process shown in FIG. 2 and by decreasing the reception sensitivity of the wireless reception unit 70 to be lower than that in the normal mode via the reception sensitivity changing unit 66.

In S430, an initial value (value 0) is set to a search counter that counts the number of searches of the pairing setting signals transmitted following the pairing request signal from the electric power tool 10.

Subsequently in S440, the control unit 60 calculates a transmission time period required from when it is determined in S410 that the pairing request signal has been received to when the pairing request signals for all the CHs are transmitted from the electric power tool 10, and waits for elapse of the transmission time period.

The transmission time period is set on the basis of the specific time period T1 for which the pairing request signal for one CH is transmitted from the electric power tool 10 and on the basis of the number of the remaining CHs for the pairing request signals to be transmitted from the electric power tool 10 after it is determined in S410 that the pairing request signal has been received (=the number of all the CHs−the registered CH number). That is, the transmission time period is set as "T1×the number of the remaining CHs".

When the waiting time in S440 has reached the transmission time period, the process proceeds to S450, where the reception frequency in the wireless reception unit 70 is initialized via the reception frequency changing unit 64 so that the reception CH in the wireless reception unit 70 becomes the initial value, i.e., CH1.

Subsequently in S460, it is determined whether the pairing setting signal has been received by the wireless reception unit 70. If the pairing setting signal has not been received, the process proceeds to S490.

If it is determined in S460 that the pairing setting signal has been received, the search counter is counted up (+1) in S470. Subsequently in S480, the current reception CH in the wireless reception unit 70 is stored, and then, the process proceeds to S490.

In S490, it is determined whether the determination on reception of the pairing setting signal in S460 has been performed for all the CHs (e.g., CH1 to CH78) stored in the memory 62.

If it is determined in S490 that the determination on reception of the pairing setting signal in S460 has not been performed for all the CHs, the process proceeds to S500, where the CH number of the reception CH in the wireless reception unit 70 is counted up by the value 1 (+1), to thereby update the reception CH. Then, the process proceeds to S460.

As a result, the reception frequency of the pairing setting signal in the wireless reception unit 70 is sequentially changed from CH1 to the largest CH number (e.g., CH78), while it is determined in S460 whether the pairing setting signal has been received through each reception CH.

If it is determined in S490 that the determination on reception of the pairing setting signal has been performed for all the CHs, the process proceeds to S510, where it is determined whether the value of the search counter is "1", in other words, whether the pairing setting signal has been received for only a specific one CH among all the CHs.

If it is determined in S510 that the value of the search counter is "1", the process proceeds to S520, where the reception CH stored in S480 (stored CH) is registered as the transmission CH through which the linking signal has been transmitted from the electric power tool 10 that is a link target appliance, and the registered CH stored in the memory 62 is thus rewritten.

Subsequently in S530, the buzzer 56 is sounded for a specific period of time (e.g., for 1 s), to thereby inform the user that the pairing with the electric power tool 10 has been performed properly (that the pairing has succeeded), and the process proceeds to S550.

If it is determined in S510 that the value of the search counter is not "1", the pairing setting signal has not been received or the pairing setting signals from a plurality of the electric power tools 10 have been received in the processes in S460 to S490 performed this time. Thus, the process proceeds to S540.

In S540, the buzzer 56 is turned on and off several times for a specific period of time (e.g., for 3 s) and is sounded intermittently, to thereby inform the user that the pairing with the electric power tool 10 has failed. Then, the process proceeds to S550.

In S550, the operation mode of the control unit 60 is shifted to a normal mode, and the pairing process is terminated. The shift to the normal mode in S550 is performed by restoring the reception sensitivity of the wireless reception unit 70 via the reception sensitivity changing unit 66 to thereby start the link control process shown in FIG. 2.

As explained above, in the linked system of the present embodiment, when registering the electric power tool 10 in the dust collector 50 to cause the dust collector 50 to operate in a linked manner, the user only has to operate the pairing request SW 34 in the electric power tool 10.

Upon operation of the pairing request SW 34 by the user, the operation mode of the control unit 20 is shifted to the pairing mode, and the pairing request signal and the pairing setting signal are sequentially transmitted from the wireless transmission unit 30 to the dust collector 50.

In the dust collector 50, the pairing request signal is received by the wireless reception unit 70, and the operation mode of the control unit 60 is shifted to the pairing mode. Then, the electric power tool 10 that has transmitted the pairing setting signal is registered as a link target appliance on the basis of the pairing setting signal received by the wireless reception unit 70.

Accordingly, with the linked system of the present embodiment, when registering the electric power tool 10 to be a link target appliance in the dust collector 50, the user can perform registration (i.e., pairing) of the electric power tool 10 very easily without the necessity of operating an operation unit in the dust collector 50.

Information on the electric power tool 10 to be registered in the dust collector 50 for linked operation is the transmission CH through which the electric power tool 10 transmits the linking signal for linked operation (in other words, transmission frequency), and thus, it is not necessary to register identification information contained in a signal transmitted from the electric power tool 10, as in a conventional way.

In the present embodiment, all that has to be done to register the electric power tool 10 in the dust collector 50 and to cause the dust collector 50 to operate in a linked manner with the electric power tool 10 is to transmit the wireless signal in one direction from the electric power tool 10 to the dust collector 50, and two-way communication between the electric power tool 10 and the dust collector 50 need not be performed.

Thus, the linked system of the present embodiment enables very easy communication between the electric power tool 10 and the dust collector 50, and also enables simplification of a configuration of communications equipment provided to the electric power tool 10 and the dust collector 50.

The control unit 20 in the electric power tool 10 and the control unit 60 in the dust collector 50 each return to a normal mode automatically upon elapse of a given period of time set for transmission or reception of the pairing request signals and the pairing setting signals after each shift of the operation mode to the pairing mode in each pairing process.

As a result, the user need not operate the operation unit provided to the electric power tool 10 or the dust collector 50 in order to return the operation mode of each of the control units 20 and 60 from a pairing mode to a normal mode. Thus, the linked system of the present embodiment enables improvement in usability of the electric power tool 10 and the dust collector 50.

The electric power tool 10 has the transmission prohibition SW 36, and when the transmission prohibition SW 36 is in an ON state, the control unit 20 prohibits transmission of a linking signal from the wireless transmission unit 30. Thus, the user can use the electric power tool 10 independently by prohibiting transmission of a linking signal from the electric power tool 10 to the dust collector 50.

The dust collector 50 has the pairing prohibition SW 74, and when the pairing prohibition SW 74 is in an ON state, the control unit 60 stops performing the pairing process.

Thus, for example, when there is no need to register the electric power tool 10 in the dust collector 50, the user operates the pairing prohibition SW 74 to thereby avoid a situation in which the control unit 60 goes into a pairing mode and the electric power tool 10 that is not a link target appliance is erroneously registered.

When in the pairing mode, the control unit 20 in the electric power tool 10 decreases the transmission output (transmission power) from the wireless transmission unit 30 to be lower than that in the normal mode, and, when in the pairing mode, the control unit 60 in the dust collector 50 decreases the reception sensitivity of the wireless reception unit 70 to be lower than that in the normal mode.

As a result, an appliance that receives the pairing request signal and the pairing setting signal transmitted from the electric power tool 10 and in which the electric power tool 10 is registered as a link target appliance is limited to the dust collector 50 that is close enough to the electric power tool 10 to ensure good communication environments.

Thus, the linked system of the present embodiment makes it possible to reduce the possibility that the electric power tool 10 is erroneously registered, as a link target appliance, in the dust collector 50 that need not be linked.

The dust collector 50 has the buzzer 56 for informing the user. This makes it possible to inform those around the dust collector 50 of whether the control unit 60, after going into the pairing mode, has succeeded or failed in proper registration of the electric power tool 10 as a link target appliance.

Thus, after operating the pairing request SW 34, the user of the electric power tool 10 can check whether the electric power tool 10 has been properly registered in the intended dust collector 50 as a link target appliance.

In the present embodiment, the control unit 20 in the electric power tool 10 corresponds to one example of a transmission control unit of the present disclosure, and the control unit 60 in the dust collector 50 corresponds to one example of a reception control unit of the present disclosure.

Second Embodiment

Figure 4:
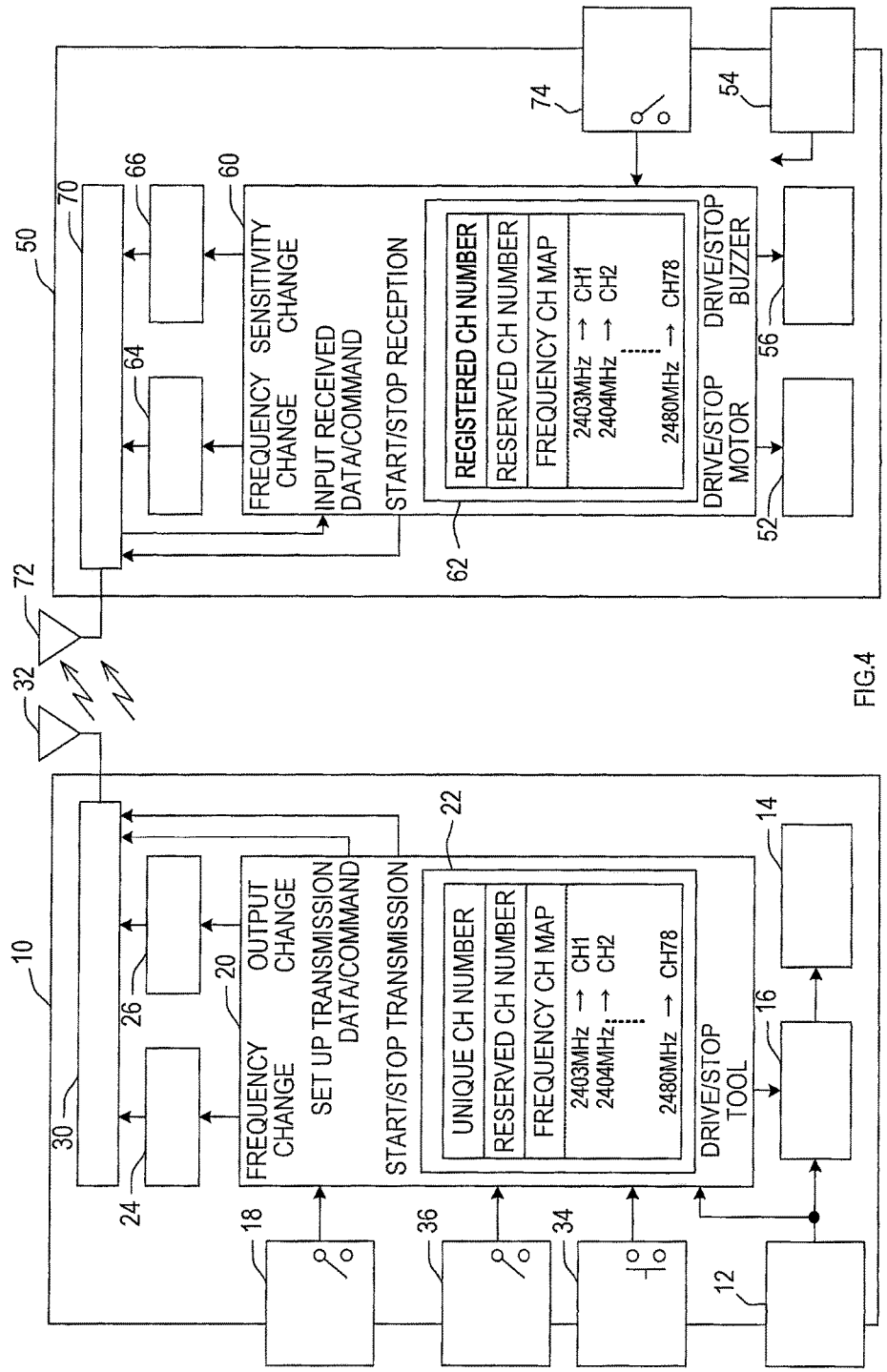
FIG. 4 is a block diagram showing a configuration of a linked system in a second embodiment.

As shown in FIG. 4, a linked system of the present second embodiment has a configuration approximately similar to the linked system of the first embodiment. A difference from the first embodiment is that a reserved CH is stored in the memory 22 in the electric power tool 10 and the memory 62 in the dust collector 50.

The linked system of the present second embodiment is configured such that, in the electric power tool 10, the unique CH for transmission of a linking signal stored in the memory 22 can be changed by external operation.

Here, the reserved CH is a communication CH set in advance for transmission and reception of a pairing request signal by the electric power tool 10 and the dust collector 50, respectively.

In a pairing process performed by the control unit 20 in the electric power tool 10, after shifting to a pairing mode, a process in S345 is performed, in which a pairing request signal is transmitted from the wireless transmission unit 30 for the specific time period T1 at a transmission frequency of the reserved CH, instead of the processes in S330 to S360.

In a pairing process performed by the control unit 60 in the dust collector 50, a process in S412 is performed, in which the reception CH in the wireless reception unit 70 is set to the reserved CH and whether the pairing request signal has been received through the reserved CH is determined, instead of the process in S410. If it is determined in S412 that the pairing request signal has been received through the reserved CH, the processes in and after S420 are performed similarly to the first embodiment.

As described above, in the present second embodiment, the communication CH for transmission and reception of the pairing request signal is set in advance, and the communication CH is stored in the memories 22 and 62 as the reserved CH. In this way, the pairing request signal is transmitted from the electric power tool 10 and received by the dust collector 50 through the reserved CH.

As a result, the linked system of the present second embodiment eliminates the necessity of causing the pairing request signals to be transmitted from the electric power tool 10 through all the CHs in order to shift the operation mode of the control unit 60 in the dust collector 50 to a pairing mode, to thereby enable shortening of a communication time period.

Thus, the linked system of the present second embodiment enables pairing of the electric power tool 10 and the dust collector 50 in a shorter time than in the linked system of the first embodiment.

Figure 5A:
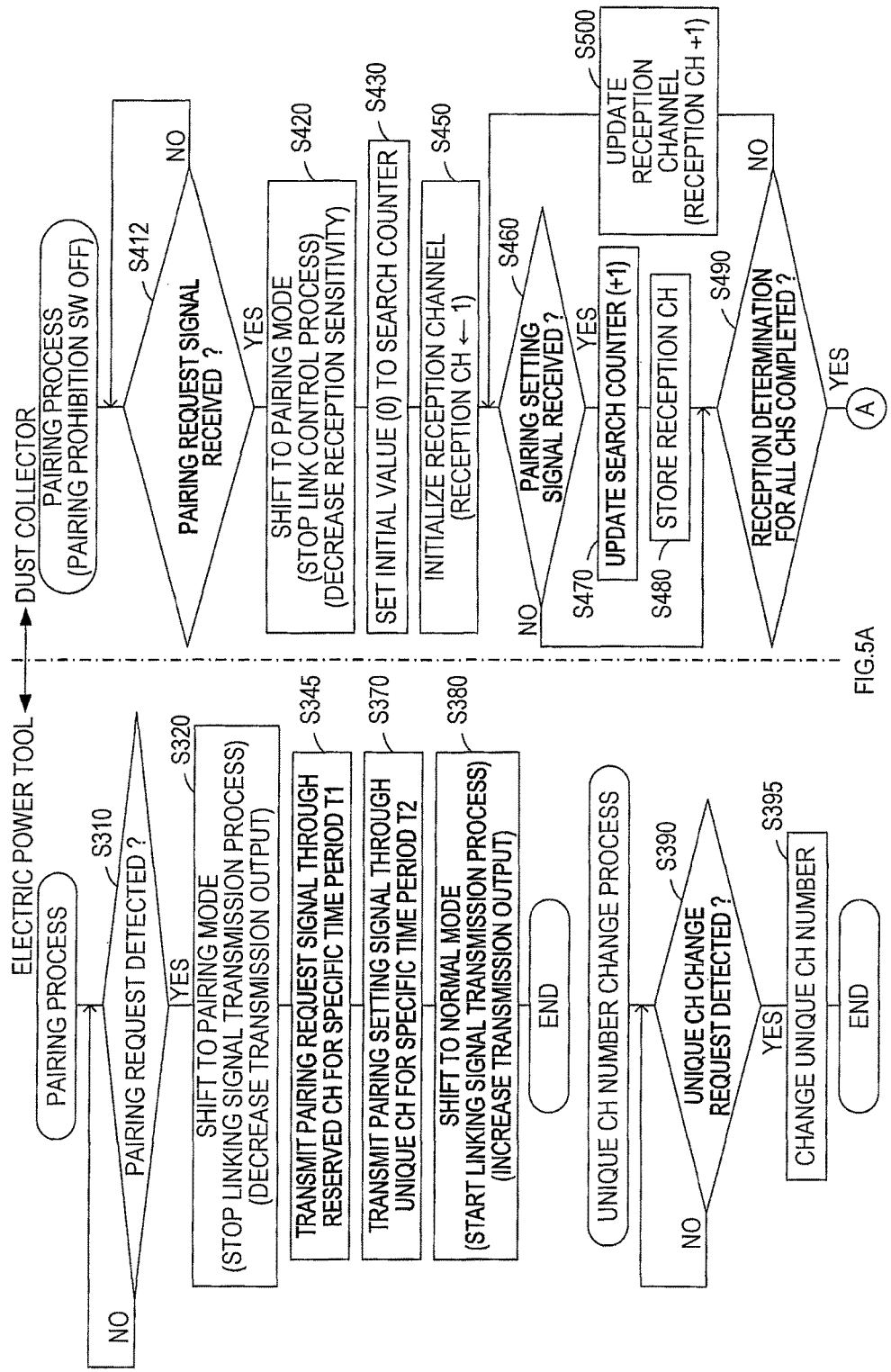
FIG. 5A is a flowchart showing paring processes and a unique channel number changing process in the second embodiment.
Figure 5B:
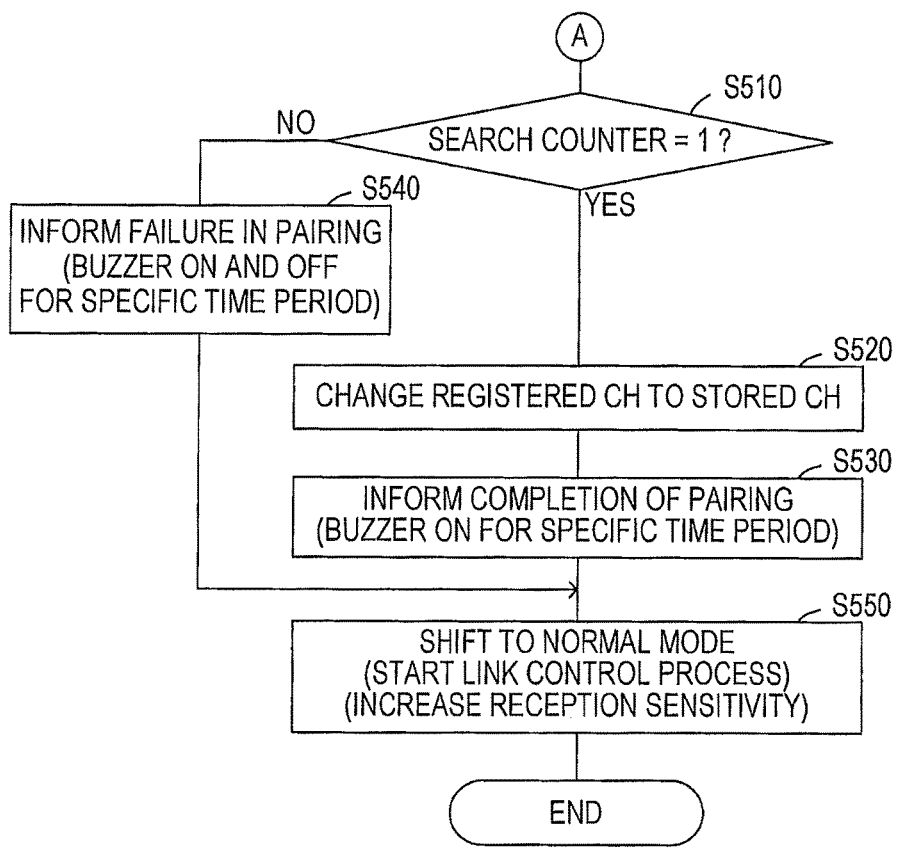
FIG. 5B is the flowchart showing the pairing process in the second embodiment.

In the electric power tool 10, when the operation mode of the control unit 20 is a normal mode, the control unit 20 performs a unique CH number changing process shown in FIG. 5A independently of the linking signal transmission process and the pairing process.

In the unique CH number changing process, in S390, it is determined whether a unique CH changing request has been inputted on the basis of whether the pairing request SW 34 has been held down for a given period of time or longer (i.e., kept pressed down), and the control unit 20 waits until a unique CH changing request is inputted.

If it is determined in S390 that a unique CH changing request has been inputted, the process proceeds to S395, where the unique CH stored in the memory 22 is changed to a value different from the current CH number. Then, the unique CH number changing process is terminated.

In the present second embodiment, if the transmission CH through which the linking signal is transmitted from the electric power tool 10 is the registered CH registered in the memory 62, the dust collector 50 drives the dust collection motor 52 in accordance with the linking signal.

Thus, for example, when a plurality of the electric power tools 10 having the same unique CH set therein are present in the vicinity of the dust collector 50, the dust collector 50 operates in response to a linking signal transmitted from each electric power tool 10.

However, in the electric power tool 10, if the control unit 20 is designed to perform the above-described unique CH number changing process, a user of the proper electric power tool 10 can change the unique CH in the electric power tool 10 by, for example, keeping the pairing request SW 34 pressed down.

After the unique CH is changed, if a pairing request is inputted by operating (quickly pressing and releasing) the pairing request SW 34, the changed unique CH can be re-registered in the electric power tool 10.

Thus, the linked system of the present second embodiment enables one-to-one correspondence between the electric power tool 10 and the dust collector 50, and makes it possible to inhibit the dust collector 50 from operating in response to linking signals from the plurality of electric power tools 10.

Reference Example

In the present disclosure, the electric power tool 10 can be registered in the dust collector 50 as a link target appliance without operation of the dust collector 50.

Figure 6:
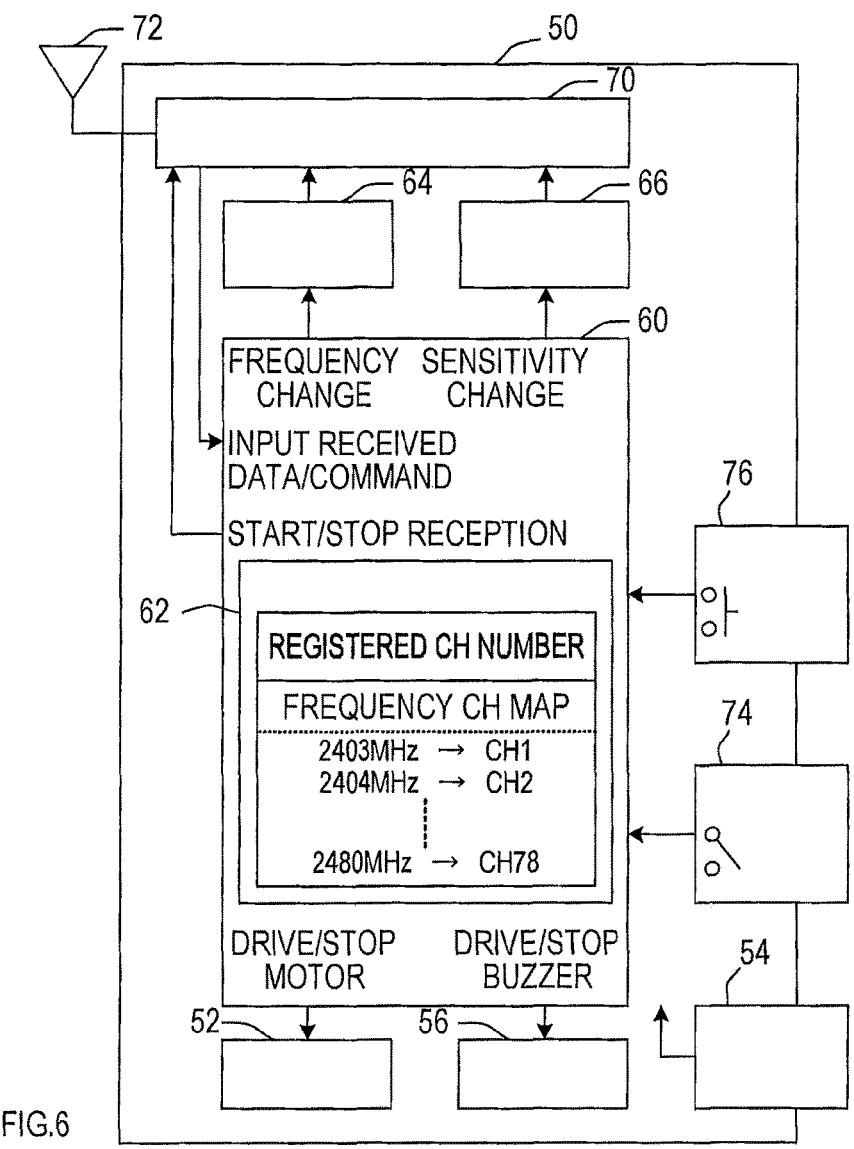
FIG. 6 is a block diagram showing a configuration of a dust collector in a reference example.

On the other hand, as shown in FIG. 6, the dust collector 50 may comprise a pairing request SW 76 so that the operation mode of the control unit 60 is shifted to a pairing mode when the pairing request SW 76 is operated.

In this case, when registering the electric power tool 10 in the dust collector 50, the pairing request SW 76 in the dust collector 50 needs to be operated.

However, similarly to the above-described embodiments, wireless communication between the electric power tool 10 and the dust collector 50 can be performed very easily by storing, in the memory 62, the transmission CH through which a pairing setting signal for pairing is transmitted from the electric power tool 10 to the dust collector 50.

Figure 7A:
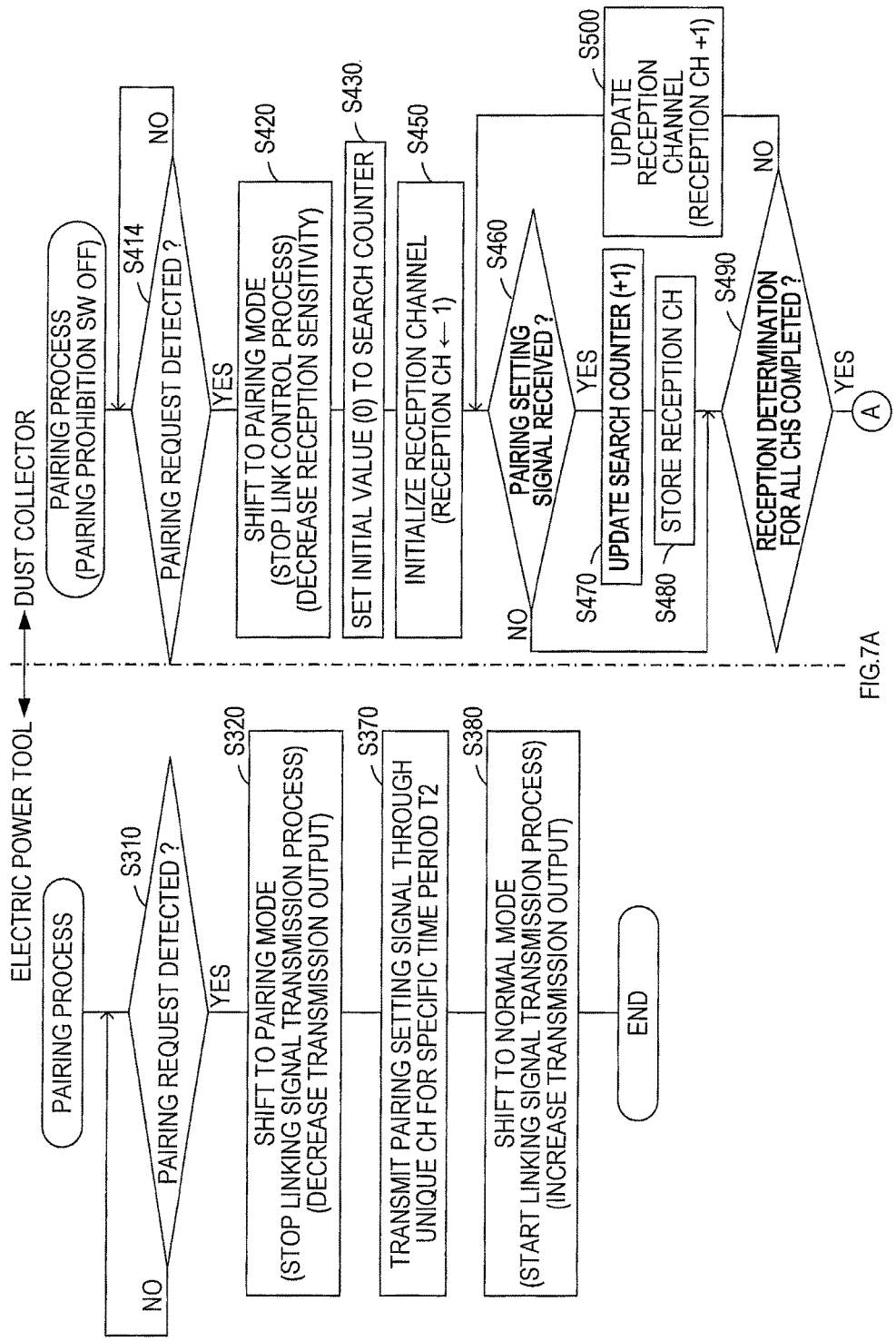
FIG. 7A is a flowchart showing pairing processes in the reference example.
Figure 7B:
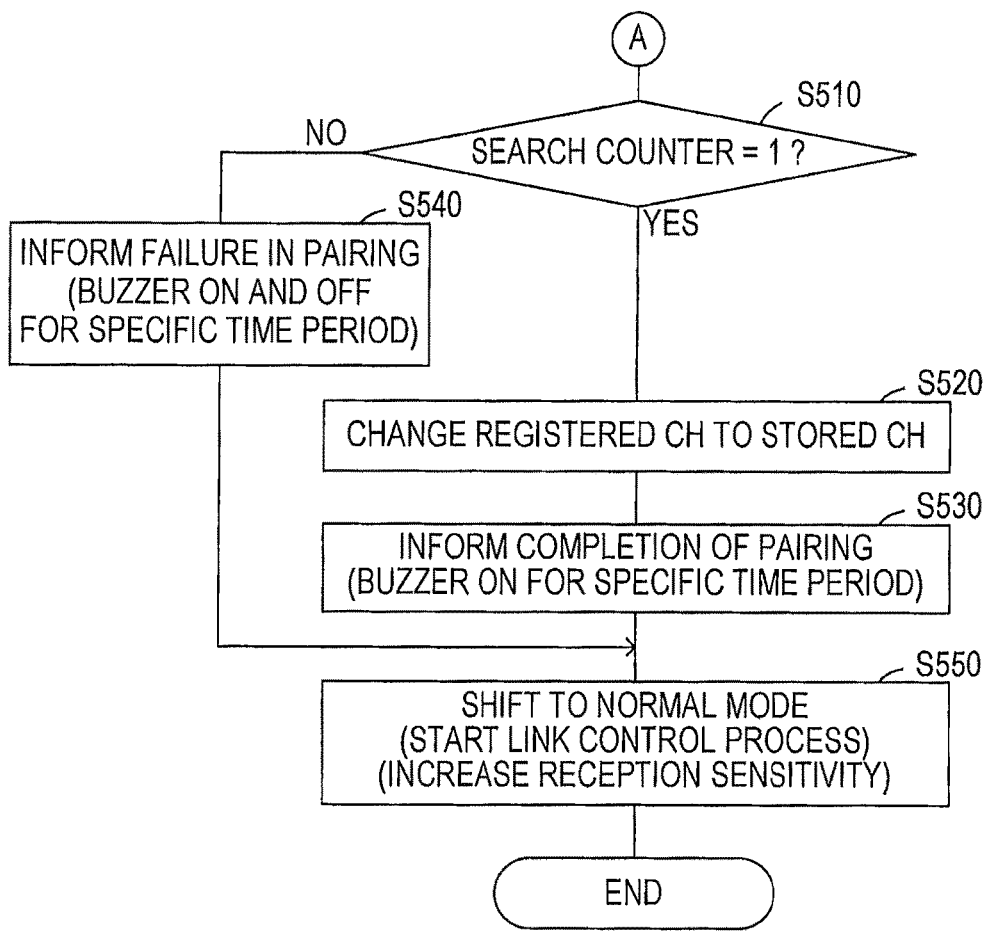
FIG. 7B is the flowchart showing the pairing process in the reference example.

In this case, in the pairing process performed by the control unit 60 in the dust collector 50, the process in S410 in the pairing process in the first embodiment shown in FIG. 3A is replaced by a process in S414 shown in FIG. 7A to determine whether the pairing request SW 76 has been operated. That is, when it is determined in S414 that the pairing request SW 76 has been operated, the processes in and after S420 are performed.

In the pairing process performed by the control unit 20 in the electric power tool 10, transmission of a pairing request signal is unnecessary. Thus, after shifting to a pairing mode in S320, a pairing setting signal is transmitted for the specific time period T2 in S370, and then, the control unit 20 returns to a normal mode in S380.

In this case, the electric power tool 10 need not necessarily comprise the pairing request SW 34.

For example, in the pairing process performed by the control unit 20 in the electric power tool 10, in S310, when the trigger SW 18 is turned from an ON state to an OFF state (i.e., when driving of the tool motor 14 is stopped), it is determined that a pairing request operation has been performed, and the process proceeds to S320.

In this way, the operation mode of the control unit 20 can be shifted to a pairing mode without the pairing request SW 34 being provided thereto.

Although the embodiments and the reference example of the present disclosure have been described as above, the present disclosure is not limited to the above-described embodiments, and can take various forms without departing from the spirit of the present disclosure.

For example, although wireless communication between the electric power tool 10 and the dust collector 50 has been explained as being performed in one direction from the electric power tool 10 to the dust collector 50, two-way communication may be performed, for example, when registering the electric power tool 10 in the dust collector 50.

The information on the electric power tool 10 registered in the dust collector 50 has been explained as being the communication CH used for transmission of the linking signal by the electric power tool 10. However, the information on the electric power tool 10 registered in the dust collector 50 may be unique identification information (e.g., a serial number, a communication ID, and the like) assigned to the electric power tool 10.

In this case, however, such identification information needs to be contained in the signal transmitted from the electric power tool 10 to the dust collector 50.

In the above-described embodiments, the dust collector 50 has been explained as corresponding one-to-one to the electric power tool 10 by registering the information on the electric power tool 10 (transmission CH) in the dust collector 50. However, information (transmission CH or the like) on the plurality of electric power tools 10 that could become a link target appliance may be registered in the memory 62 in the dust collector 50, for example, and the dust collector 50 may be designed to operate in a linked manner when receiving the linking signal from the registered electric power tool 10.

In the linked system of the above-described embodiments, the electric power tool 10 is a rechargeable tool provided with a rechargeable battery. However, the electric power tool may be of a type that operates by receiving a commercial power supply.

This eliminates the necessity of supplying a drive current from the dust collector to the electric power tool, and thus, it is possible to increase electric power that can be consumed solely by the dust collector, to thereby further enable improvement in performance of the dust collector.

For example, when the electric power tool is an electric power tool that operates by receiving a commercial power supply (generally an AC tool), the dust collector is conventionally provided with a plug socket for providing a commercial power supply to the electric power tool. A control circuit in the dust collector detects operation of the electric power tool on the basis of a current flowing from the plug socket to the electric power tool, and drives a dust collection motor to thereby cause the dust collector to operate in a linked manner with the electric power tool.

In this case, a current for causing the dust collector and the electric power tool to operate simultaneously needs to be supplied from the commercial power supply to the dust collector via a power-supply code. To achieve this, the supplied current has to be kept to a rated current or lower of the commercial power supply.

Thus, the current consumed for driving the dust collection motor in the dust collector conventionally has to be much lower than the rated current of the commercial power supply in view of the current consumed in the electric power tool. This results in the necessity of limiting dust collecting performance of the dust collector.

However, if the present disclosure is applied to the linked system of this kind, the current consumed in the electric power tool need not be detected in the dust collector. This enables the dust collector and the electric power tool to individually receive power supply from a commercial power supply, and thus, further enables improvement of performance of the dust collector.

What is claimed is:

1. An electric power tool comprising:
   a wireless transmission unit that transmits a wireless signal to a dust collector; and
   a transmission control unit that causes the wireless transmission unit to transmit a linking signal to the dust collector, to thereby cause the dust collector to operate in a linked manner,
   wherein an operation mode of the transmission control unit is shifted, by operation of an operation unit, from a normal mode in which the dust collector is caused to operate in the linked manner to a pairing mode in which the electric power tool is caused to be registered in the dust collector as a link target appliance, and
   wherein the transmission control unit is configured, when in the pairing mode, to cause the wireless transmission unit to transmit a pairing request signal to the dust collector, to thereby cause the electric power tool to be registered in the dust collector as the link target appliance.

2. The electric power tool according to claim 1, comprising, as the operation unit, a pairing request switch for inputting a request for shifting to the pairing mode.

3. The electric power tool according to claim 1,
   wherein the wireless transmission unit is configured to select a communication channel from a plurality of communication channels having different frequencies and to transmit the wireless signal through the selected communication channel.

4. The electric power tool according to claim 3,
   wherein the transmission control unit is configured to sequentially change the communication channel used for transmission of the pairing request signal to another communication channel among the plurality of communication channels and to cause the pairing request signal to be transmitted through the another communication channel.

5. The electric power tool according to claim 3,
   wherein the transmission control unit is configured to cause the pairing request signal to be transmitted through a reserved channel set in advance for transmission of the pairing request signal, among the plurality of communication channels.

6. The electric power tool according to claim 3,
   wherein the transmission control unit is configured to cause the wireless transmission unit to transmit the pairing request signal to the dust collector to thereby shift an operation mode in the dust collector to a pairing mode, and then, to cause the wireless transmission unit to transmit a pairing setting signal to the dust collector through a unique channel, which is one of the plurality of communication channels, to thereby cause the electric power tool to be registered in the dust collector as the link target appliance.

7. The electric power tool according to claim 6,
   wherein the transmission control unit is configured to change the unique channel in accordance with a channel change command inputted externally.

8. The electric power tool according to claim 7, comprising an operation unit for inputting the channel change command by external operation.

9. The electric power tool according to claim 8 comprising, as the operation unit, a pairing request switch for inputting a request for shifting to the pairing mode,
   wherein the operation unit for inputting the channel change command is the pairing request switch, and
   wherein the transmission control unit is configured to distinguish between the request for shifting to the pairing mode and the channel change command on the basis of an operation time period or the number of operations of the pairing request switch.

10. The electric power tool according to claim 1,
    wherein the transmission control unit is configured to cancel the pairing mode of the transmission control unit upon elapse of a specified time period set in advance after the operation mode is shifted to the pairing mode by operation of the operation unit.

11. The electric power tool according to claim 1, comprising a transmission prohibition switch for inputting a transmission prohibition command for prohibiting transmission of the linking signal from the wireless transmission unit,
    wherein the transmission control unit is configured to prohibit transmission of the linking signal from the wireless transmission unit when the transmission prohibition command is inputted via the transmission prohibition switch.

12. The electric power tool according to claim 1,
    wherein the transmission control unit is configured, when in the pairing mode, to decrease a transmission output from the wireless transmission unit to be lower than that in the normal mode.

13. A dust collector comprising:
    a motor for dust collection;
    a wireless reception unit that receives at least one wireless signal transmitted from at least one electric power tool; and
    a reception control unit that drives the motor in accordance with at least one linking signal received by the wireless reception unit,
    wherein, when at least one pairing request signal is received by the wireless reception unit, an operation mode of the reception control unit is shifted from a normal mode in which the motor is driven in accordance with the at least one linking signal to a pairing mode, and wherein the reception control unit is configured, when in the pairing mode, to register a specific electric power tool that has transmitted one of the at least one pairing request signal, among the at least one electric power tool, as a link target appliance that will transmit one of the at least one linking signal for driving the motor.

14. The dust collector according to claim 13,
wherein the wireless reception unit is configured to select a communication channel from a plurality of communication channels having different frequencies and to receive the at least one wireless signal through the selected communication channel.

15. The dust collector according to claim 14,
wherein the reception control unit is configured to set the communication channel through which the wireless reception unit receives the wireless signal to a specific channel set in advance and to cause the pairing request signal to be received through the specific channel.

16. The dust collector according to claim 14,
wherein the reception control unit is configured, when the pairing request signal is received by the wireless reception unit and the operation mode of the reception control unit is shifted from the normal mode to the pairing mode, to sequentially change the communication channel through which the wireless reception unit receives the wireless signal from among the plurality of communication channels, to cause the wireless reception unit to receive a pairing setting signal transmitted from the electric power tool, and to register the communication channel through which the pairing setting signal has been received as a unique channel through which the link target appliance will transmit the linking signal.

17. The dust collector according to claim 16,
wherein the reception control unit is configured, in a case where the unique channel has been already registered and when the operation mode of the reception control unit is shifted from the normal mode to the pairing mode and the pairing setting signal transmitted through the communication channel different from the unique channel is received, to register the communication channel through which the pairing setting signal has been received as a new unique channel to thereby update registration of the unique channel.

18. The dust collector according to claim 13,
wherein the reception control unit is configured to cancel the pairing mode upon elapse of a specified time period set in advance after the operation mode of the reception control unit is shifted to the pairing mode.

19. The dust collector according to claim 13, comprising a pairing prohibition switch for inputting a pairing prohibition command for prohibiting the operation mode of the reception control unit from being shifted to the pairing mode,
wherein the reception control unit is configured, when the pairing prohibition command is inputted via the pairing prohibition switch, to prohibit the operation mode of the reception control unit from being shifted from the normal mode to the pairing mode by reception of the pairing request signal by the wireless reception unit.

20. The dust collector according to claim 13,
wherein the reception control unit is configured, when in the pairing mode, to decrease a reception sensitivity of the wireless reception unit to be lower than that in the normal mode.

* * * * *